Feb. 4, 1941. V. PARKINS 2,230,904
FISH LURE
Filed Sept. 15, 1939
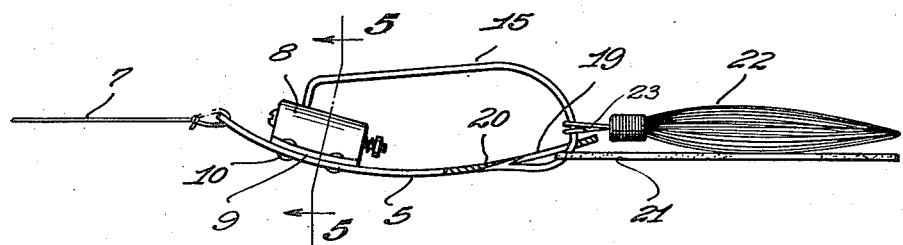
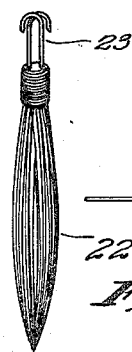
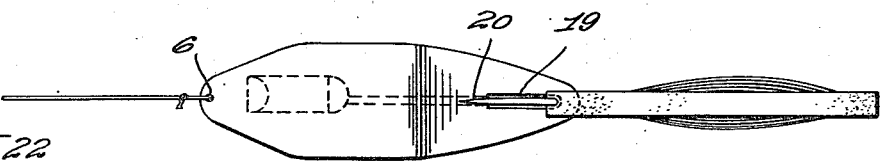
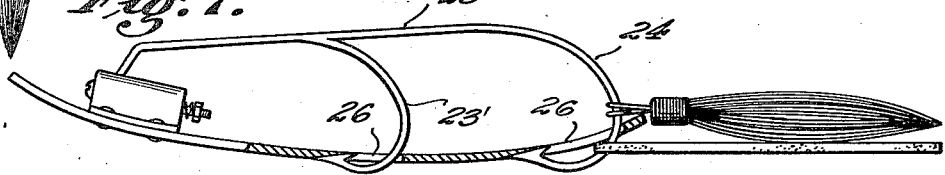
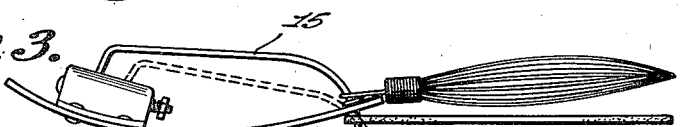
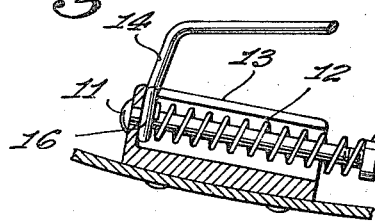
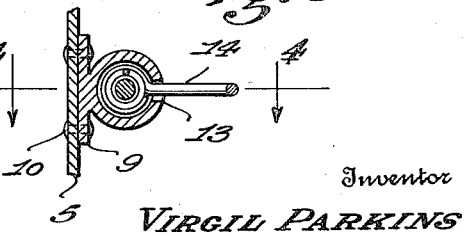
Inventor
VIRGIL PARKINS
By Lacey & Lacey, Attorneys Patented Feb. 4, 1941

2,230,904

UNITED STATES PATENT OFFICE 2,230,904

FISH LURE

Virgil Parkins, Tiffin, Ohio

Application September 15, 1939, Serial No. 295,141

5 Claims. (Cl. 43—39)

This invention relates to fish lures and more particularly to a weedless lure.

The object of the invention is to provide a fish lure of simple and inexpensive construction in which the point of the hook is normally housed within a recess in the body of the lure so as to prevent the lure from becoming entangled in grass, weeds or the like when making a casting or when drawing the lure through the water, the construction of the device being such that, when a fish takes the bait or lure, the pull on the lure will automatically actuate the hook to impale the lower jaw of the fish and thus prevent its escape.

A further object of the invention is to provide a fish lure comprising a spoon-shaped body portion having a hook pivotally mounted on one end thereof with its barbed end movable in a slot in said body portion, there being a spring operatively connected with the pivoted end of the hook for yieldably supporting said hook and preventing line breakage.

A further object is to provide means for adjusting tension of the spring and means for centering and guiding the shank of the hook within the casing of said spring.

A still further object of the invention is generally to improve this class of devices so as to increase their utility, durability and efficiency as well as to reduce the cost of manufacture.

In the accompanying drawing forming a part of this specification and in which similar numerals of reference indicate corresponding parts in all the figures of the drawing:

Figure 1 is a side elevation of a weedless fish lure embodying the present invention, Figure 2 is a bottom plan view, Figure 3 is a side elevation showing how the hook operates to impale a fish, Figure 4 is a detail longitudinal sectional view taken on the line 4—4 of Figure 5, Figure 5 is a transverse sectional view taken on the line 5—5 of Figure 1, Figure 6 is a perspective view of the bucktail detached and showing the construction of the hooked end thereof, and Figure 7 is a longitudinal sectional view illustrating a modified form of the invention.

The improved fish lure forming the subject-matter of the present invention comprises a substantially spoon-shaped body portion 5 which may be constructed of metal or molded or otherwise formed from suitable thermo-plastic material, said body portion having its forward end provided with an eye 6 to permit the attachment of a leader 7, the latter being connected with a fishing line in the usual manner.

Secured to the concave side of the body portion 5 near the forward end thereof is a cylindrical casing 8 which may be formed integral with the body portion or provided with lateral attaching flanges 9 having openings therein for the reception of rivets or similar fastening devices 10. The rear wall of the casing 8 is closed, and extending through said closed end is a rod or bolt 11, around which is fitted a coiled spring 12. The casing 8 is provided with a longitudinally disposed slot 13, and extending through said slot is the angular portion 14 of a fish hook, indicated at 15. The angular portion 14 of the hook is bent to form an eye 16 which encircles the rod 11 and normally bears against the closed end of the casing, as best shown in Figure 4 of the drawing. The inner end of the rod 11 is threaded at 17 for engagement with a nut 18, by rotating which the tension of the spring 12 may be adjusted at will. The free end of the hook 15 extends through a longitudinal slot 19 formed in the rear end of the spoon-shaped body portion and communicating with said slot is a seat or recess 20 which serves to normally house the barb of the hook and thus prevent the lure from becoming entangled in weeds, grass and the like when making a casting or when drawing the lure through the water.

The hook 15 supports a pork rind 21 and, if desired, a bucktail 22 may also be supported on the hook either above or below the spoon-shaped body portion to assist in attracting the fish to the bait or lure. The bucktail 22 is provided with an attaching hook 23 for detachable engagement with the shank 15 of the hook, as shown. Tension of the spring 12 is such as to normally and yieldably hold the barbed end of the hook to its seat 20 in the spoon-shaped body portion. When a fish takes the bait, however, the free end of the hook 15 will be forced outwardly through the slot 19 so as to cause the barbed end of the hook to impale the lower jaw of the fish and thus prevent its escape. When the fish is removed from the hook, tension of the spring 12 will normally return the barbed end of the hook to its seat 20 within the spoon-shaped body portion. Should the fish exert an excessive pull on the lure, the spring 12 will compensate for said pull and thus prevent breakage of the fishing line. It will be noted that the rear wall of the slot 19 by engagement with the adjacent portion of the hook serves to prevent rearward movement of said hook when the bill of the hook is housed within the seat 20 but when the barbed end of the hook is partially projected through the slot 19, there is sufficient play between the hook and the rear wall of the slot 19 to allow sliding movement of the eye 16 on the rod 10 against the tension of the spring 12 to cushion the hook, as indicated in dotted lines in Figure 3 of the drawing. It will, furthermore, be noted that the slot 13 in the casing 8 serves to prevent lateral tilting movement of the angular portion 14 of the hook and also form a guide for said angular portion when a longitudinal pull is exerted on the hook.

In Figure 7 of the drawing, I have illustrated a modified form of the invention, in which two hooks 23' and 24 are secured to the shank 25 and the body portion or spoon provided with an opening 26 for the barbed end of each hook, the construction and operation of the device being otherwise similar to that shown in Figure 1 of the drawing.

It will, of course, be understood that the devices may be made in different sizes and shapes and coated or painted in different colors to render the lure attractive to the fish.

Having thus described the invention, what is claimed as new is:

1. A fish lure comprising a body portion having means at one end thereof for attachment to a fishing line and its other end provided with a longitudinally disposed slot and a tapered seat communicating with a slot, a casing secured to one side of the body portion, a rod extending through said casing, a coiled spring surrounding the rod, and a hook having one end thereof provided with an eye fitting around the rod adjacent said spring and its other end normally extending through the slot with the piercing point of the hook housed within said seat.

2. A fish lure comprising a concavo-convex body portion having one end thereof provided with a longitudinally disposed slot, a longitudinally split casing secured to the concave side of the body portion near the other end thereof, a threaded bolt extending longitudinally through said casing, a hook having one end thereof provided with an angular portion terminating in an eye loosely encircling the bolt and its other end extending through the slot, a coiled spring surrounding the rod and bearing against the eye of the hook, and a nut engaging the threads on the rod for adjusting the tension of the spring.

3. A fish lure comprising a concavo-convex body portion having a longitudinal slot formed in one end thereof and provided with a depression communicating with the slot and constituting a seat, a longitudinally split casing secured to the concave side of the body portion near the other end thereof, said casing having one end thereof closed and its other end open, a bolt extending longitudinally through the casing and provided with a threaded portion, a hook having one end thereof provided with an eye loosely encircling the rod and normally bearing against the closed end of the casing and its free end normally extending through the slot with the barb of the hook housed within said seat, a coiled spring surrounding the bolt and normally bearing against said eye, and a nut engaging the threads on the bolt for adjusting the tension of the spring.

4. A fish lure comprising a concavo-convex body portion having a longitudinal slot formed therein and spaced from one end thereof, a longitudinal split casing mounted on the concave side of the body portion and provided with lateral attaching flanges, fastening devices extending through said flanges and body portion, a bolt extending longitudinally within the casing and having its outer end threaded, a hook having one end thereof provided with an angular portion terminating in an eye slidably mounted on the rod and its other end normally projecting through the slot in the body portion, a coiled spring surrounding the bolt and bearing against said eye, and a nut threaded on the rod for regulating the tension of the spring.

5. A fish lure comprising a concavo-convex body portion provided with a longitudinal slot spaced from one end thereof and provided with a depression communicating with the slot and constituting a seat, a casing secured to the concave side of the body portion, a rod extending longitudinally through the casing, a hook having one end thereof provided with an eye slidably mounted on the rod and its other end extending through the slot with the bill of the hook normally housed within said seat, a spring surrounding the rod for normally and yieldably holding the bill of the hook within said seat, and means for adjusting the tension of the spring, the bill of the hook being movable against the tension of the spring to a position in spaced relation to the convex face of the body portion for engagement with a fish when the latter attempts to take the bait.

VIRGIL PARKINS.